(12) United States Patent
Ogura

(10) Patent No.: US 12,205,347 B2
(45) Date of Patent: Jan. 21, 2025

(54) IMAGE PROCESSING DEVICE

(71) Applicant: Fanuc Corporation, Yamanashi (JP)

(72) Inventor: Shoutarou Ogura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 350 days.

(21) Appl. No.: 17/794,070

(22) PCT Filed: Feb. 1, 2021

(86) PCT No.: PCT/JP2021/003552
§ 371 (c)(1),
(2) Date: Jul. 20, 2022

(87) PCT Pub. No.: WO2021/157528
PCT Pub. Date: Aug. 12, 2021

(65) Prior Publication Data
US 2023/0068692 A1 Mar. 2, 2023

(30) Foreign Application Priority Data
Feb. 4, 2020 (JP) ................. 2020-017190

(51) Int. Cl.
*G06V 10/776* (2022.01)
*G06V 10/50* (2022.01)
*G06V 10/75* (2022.01)

(52) U.S. Cl.
CPC .......... *G06V 10/751* (2022.01); *G06V 10/507* (2022.01); *G06V 10/776* (2022.01)

(58) Field of Classification Search
CPC .............. G06V 10/751; G06V 10/507; G06V 10/776
See application file for complete search history.

(56) References Cited

U.S. PATENT DOCUMENTS

| 6,650,766 B1 | 11/2003 | Rogers et al. |
| 8,266,081 B2 | 9/2012 | Yokoi et al. |

(Continued)

FOREIGN PATENT DOCUMENTS

| JP | 2001525579 A | 12/2001 |
| JP | 2005128628 A | 5/2005 |

(Continued)

OTHER PUBLICATIONS

International Search Report and Written Opinion for International Application No. PCT/JP2021/003552, dated Apr. 13, 2021, 5 pages.

*Primary Examiner* — Sumati Lefkowitz
*Assistant Examiner* — Michael Adam Shariff
(74) *Attorney, Agent, or Firm* — Buchanan Ingersoll & Rooney PC

(57) ABSTRACT

Provided is an image processing device with which it is possible to automate the setting of a detection parameter that is suitable for obtaining a desired detection result. An image processing device is provided with: an object detection unit for detecting the image of an object from input image data using a detection parameter; a detection rate calculation unit for comparing the result of detection by the object detection unit with information that represents a desired detection result so as to calculate at least one of a non-detection rate and a false detection rate in object detection by the objection detection unit; an objective function value calculation unit for calculating the value of an objective function, the input variable of which is at least one of the non-detection rate and the false detection rate; and a detection parameter search unit for performing a search of the detection parameter by changing the value of the detection parameter and repeating object detection, calculation of at least one of the non-detection rate and the false detection rate, and calculation of the value of the objective function until the value of the objective function satisfies a prescribed condition or the (Continued)

number of times a search of the detection parameter is performed reaches a prescribed count.

6 Claims, 7 Drawing Sheets

(56) References Cited

U.S. PATENT DOCUMENTS

| | | | |
|---|---|---|---|
| 10,930,037 | B2 | 2/2021 | Namiki et al. |
| 11,227,144 | B2 | 1/2022 | Namiki et al. |
| 2018/0225113 | A1* | 8/2018 | Hasegawa ................ B25J 9/163 |

FOREIGN PATENT DOCUMENTS

| | | | |
|---|---|---|---|
| JP | 2010092119 | A | 4/2010 |
| JP | 2012069003 | A | 4/2012 |
| JP | 2013065354 | A | 4/2013 |
| JP | 2017091079 | A | 5/2017 |
| JP | 2017151813 | A | 8/2017 |
| JP | 2018126798 | A | 8/2018 |
| WO | 2020008995 | A1 | 1/2020 |

* cited by examiner

IMAGE PROCESSING DEVICE

CROSS REFERENCE TO RELATED APPLICATIONS

This is the U.S. National Phase application of PCT/JP2021/003552, filed Feb. 1, 2021, which claims priority to Japanese Patent Application No. 2020-017190, filed Feb. 4, 2020, the disclosures of these applications being incorporated herein by reference in their entireties for all purposes.

FIELD OF THE INVENTION

The present invention relates to an image processing apparatus.

BACKGROUND OF THE INVENTION

Some image processing apparatuses are known for detecting an image of a specific object from an image in the field of view of an image capture device. Such image processing apparatuses generally perform feature matching between reference information representing an object (generally referred to as a model pattern, a template, or the like) and an input image acquired by the image capture device and determine that the object has been successfully detected when the degree of matching exceeds a predetermined level (see, for example, PTL 1).

PTL 2 describes a configuration of a parameter controller as follows: "In a first stage of collation, registration data is narrowed down by high-speed and low-accuracy collation processing. Next, in a second stage of collation, the registration data is narrowed down more than in the first stage of collation by middle-speed and middle-accuracy collation processing. In an m-th stage of collation, a piece of registration data is identified by performing low-speed and high-accuracy collation processing on a small number of pieces of registration data that have been narrowed down through the plurality of collation processes in the previous stages. A parameter for adjusting the accuracy and speed of the narrowing of registration data in each collation stage is automatically calculated so that the speed of collation and/or the accuracy of collation is optimized in accordance with the registration data" (Abstract).

PATENT LITERATURE

PTL 1: JP 2017-91079 A
PTL 2: JP 2010-92119 A

SUMMARY OF THE INVENTION

In feature matching, for example, an allowable range of the distance between a feature point of a model pattern and a corresponding point in an input image is used as a detection parameter. To obtain desired detection results such as those preventing detection failure of an object to be detected or preventing false detection when the object is detected using such a detection parameter, it is necessary for the operator to adjust the detection parameter through trial and error. Desired is an image processing apparatus capable of automating the setting of a detection parameter suitable for obtaining desired detection results.

An aspect of the present disclosure is an image processing apparatus for detecting an image of an object in one or more pieces of input image data based on a model pattern for the object, the image processing apparatus including an object detection section configured to perform matching between a feature of the model pattern and a feature extracted from the one or more pieces of input image data by using a detection parameter and detect an image of the object from the one or more pieces of input image data, a detection rate calculation section configured to compare a detection result that the object detection section has obtained for the one or more pieces of input image data prepared in advance before a value of the detection parameter is set and information representing a desired detection result when detection of an image of the object has been performed on the one or more pieces of input image data to calculate at least one of a detection failure rate and a false detection rate in the detection of the object by the object detection section, an objective function value calculation section configured to calculate a value of an objective function defined as a function having at least one of the detection failure rate and the false detection rate as an input variable, and a detection parameter search section configured to change the value of the detection parameter and repeat the detection of the object by the object detection section, calculation of at least one of the detection failure rate and the false detection rate by the detection rate calculation section, and calculation of the value of the objective function by the objective function value calculation section to perform search for the detection parameter until the value of the objective function satisfies a predetermined condition or the number of searches for the detection parameter reaches a specified number.

The above configuration enables automated setting of a detection parameter suitable for obtaining desired detection results.

These objects, features and advantages and other objects, features and advantages of the present invention will be further clarified from the detailed description of typical embodiments of the present invention shown in the accompanying drawings.

DETAILED DESCRIPTION OF EMBODIMENTS OF THE INVENTION

Figure 1:
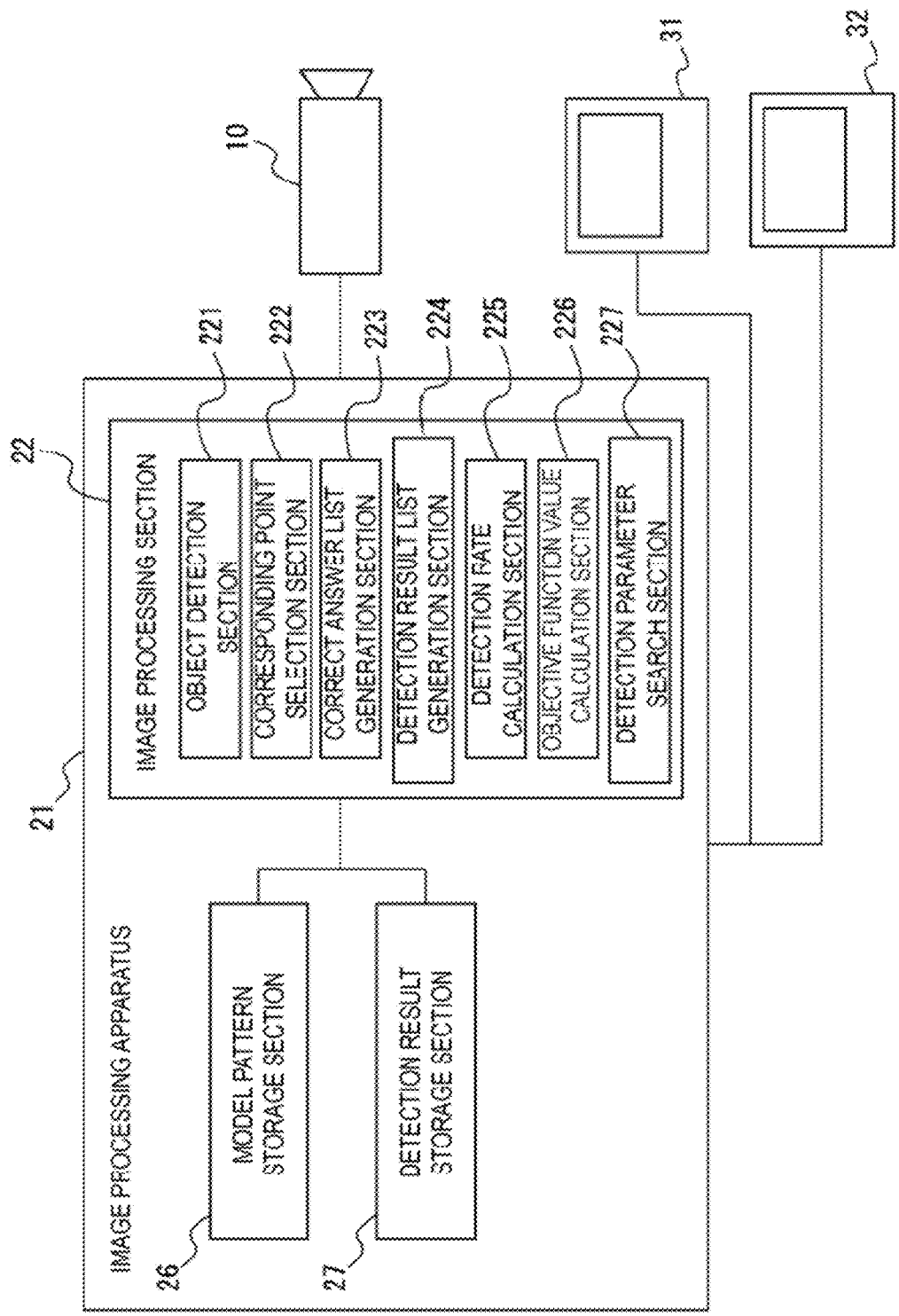
FIG. 1 is a block diagram illustrating a configuration of an image processing apparatus according to an embodiment.

Next, an embodiment of the present disclosure will be described with reference to the drawings. In the drawings to be referenced, similar components or functional parts are denoted by the same reference numerals. The drawings are appropriately scaled for ease of understanding. A form illustrated in the drawings is an example for carrying out the present invention and the present invention is not limited to the illustrated form.

FIG. 1 is a block diagram illustrating a configuration of an image processing apparatus 21 according to an embodiment. As illustrated in FIG. 1, a vision sensor 10, an operation panel 31, and a display device 32 are connected to the image processing apparatus 21. The image processing apparatus 21 has a function of detecting an image of a specific object from an image in the field of view of the vision sensor 10. The image processing apparatus 21 may have the configuration of a general computer including a CPU, a ROM, a RAM, a storage device, an input/output interface, a network interface, and the like. The operation panel 31 and the display device 32 may be provided integrally with the image processing apparatus 21.

The vision sensor 10 may be a camera that captures a shade image or a color image or a stereo camera or a three-dimensional sensor that can acquire a distance image or a three-dimensional point cloud. The present embodiment will be described assuming that a camera is used as the vision sensor 10 and the vision sensor 10 outputs a shade image. The camera is, for example, an electronic camera including an image sensor such as a charge coupled device (CCD) and is a well-known light receiving device having a function of detecting a two-dimensional image on an image capture surface (on a CCD array surface). A two-dimensional coordinate system on the imaging surface is hereinafter referred to as an image coordinate system.

Figure 2:
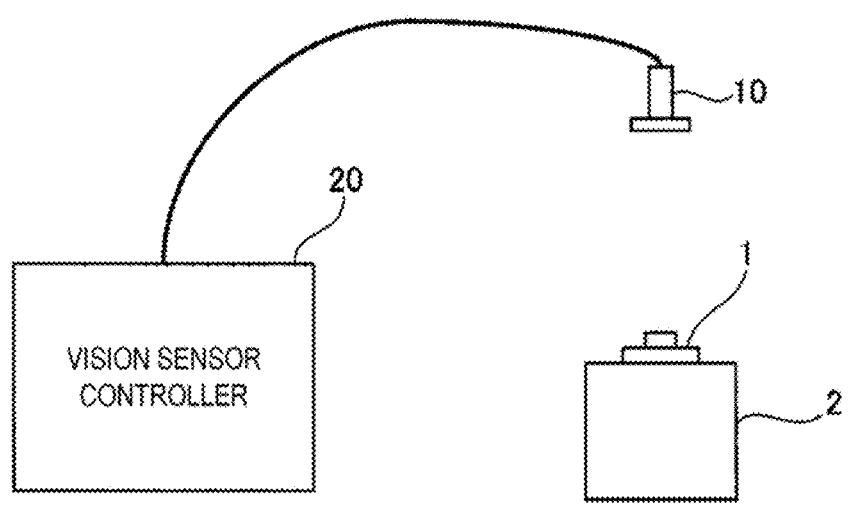
FIG. 2 is a diagram illustrating an exemplary configuration in which an object is detected by a vision sensor and a vision sensor controller including the image processing apparatus.

FIG. 2 is a diagram illustrating an exemplary configuration in which an object is detected by the vision sensor 10 and a vision sensor controller 20 including the image processing apparatus 21. As illustrated in FIG. 2, the vision sensor 10 is fixedly installed at a position where an object 1 can be captured, and the object 1 is placed on a workbench 2. In this configuration, the object 1 is detected in an image captured by the vision sensor 10.

Figure 3:
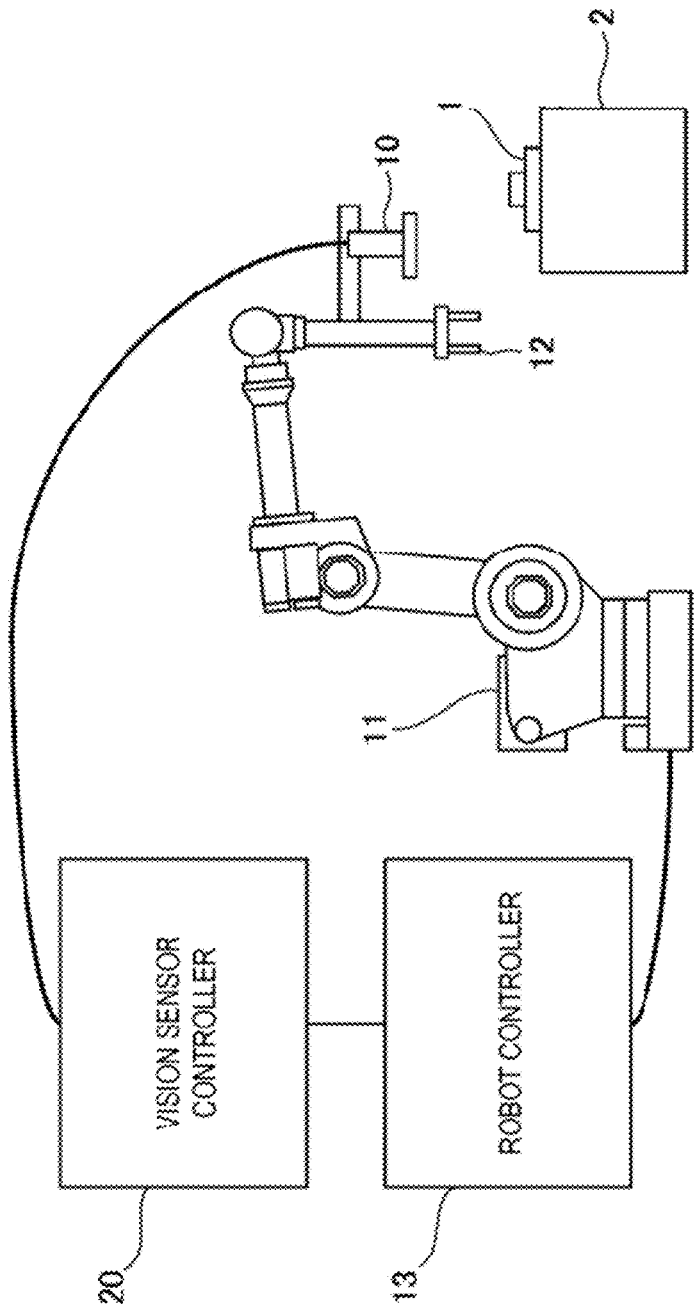
FIG. 3 is a diagram illustrating an exemplary configuration in which an object is detected from an image of a vision sensor installed at the tip of an arm of a robot.

FIG. 3 is a diagram illustrating an exemplary configuration in which the object 1 is detected from the image of the vision sensor 10 installed at the tip of an arm of a robot 11 when the object 1 on the workbench 2 is handled by a hand 12 of the robot 11 that is controlled by a robot controller 13. In the exemplary configuration of FIG. 3, the image captured by the vision sensor 10 is processed by the image processing apparatus 21 provided in the vision sensor controller 20 to detect the object 1, and position information of the detected object 1 is provided to the robot controller 13. As in this exemplary configuration, the vision sensor 10 may be installed at a movable portion such as the tip of the arm of the robot 11.

As illustrated in FIG. 1, the image processing apparatus 21 includes an image processing section 22, a model pattern storage section 26, and a detection result storage section 27. The image processing section 22 includes an object detection section 221, a corresponding point selection section 222, a correct answer list generation section 223, a detection result list generation section 224, a detection rate calculation section 225, an objective function value calculation section 226, and a detection parameter search section 227. The functions of the image processing apparatus 21 illustrated in FIG. 1 may be implemented by the CPU of the image processing apparatus 21 executing various software stored in the storage device or may be implemented by a component mainly composed of hardware such as an application specific integrated IC (ASIC).

For each of one or a plurality of input images (pieces of input image data) in which the object is captured, the object detection section 221 performs matching between a plurality of second feature points extracted from the input image and a plurality of first feature points included in a model pattern to detect one or a plurality of images of the object. For each image of one or a plurality of objects detected from the one or plurality of input images, the corresponding point selection section 222 selects second feature points corresponding to the plurality of first feature points included in the model pattern from a plurality of second feature points included in the image and stores the selected second feature points in association with the first feature points as corresponding points.

For each detection result obtained by performing a detection process on one or a plurality of input images, each including a captured image of an object to be detected, the correct answer list generation section 223 receives an operation that an operator performs to input whether the detection result is a correct detection result or an incorrect detection result, and generates a correct answer list including only correct detection results (i.e., information representing detection results desired by the operator). The detection result list generation section 224 generates a detection result list that records both detection results obtained by performing a detection process on one or a plurality of input images, each including a captured image of the object to be detected, with a set detection parameter and processing times required for the detection process.

The detection rate calculation section 225 compares the detection result list generated by the detection result list generation section 224 with the correct answer list and calculates at least one of a detection failure rate and a false detection rate. The objective function value calculation section 226 calculates a value of an objective function defined as a function having at least one of the detection failure rate and the false detection rate as an input variable. Until the value of the objective function satisfies a predetermined condition or the number of detection parameter searches reaches a specified number, the detection parameter search section 227 changes the value of the detection parameter and repeats the detection of an object, the calculation of the detection failure rate and the false detection rate, and the calculation of the value of the objective function to perform a detection parameter search.

The vision sensor 10 is connected to the image processing apparatus 21 through a communication cable. The vision sensor 10 provides captured image data to the image processing apparatus 21. The operation panel 31 is connected to the image processing apparatus 21 through a communication cable. The operation panel 31 is used to perform setting of the vision sensor 10 necessary for the image processing apparatus 21 to detect the object 1. The display device 32 is connected to the image processing apparatus 21 through a communication cable. The display device 32 displays an image captured by the vision sensor 10 and setting content that has been set by using the operation panel 31.

The image processing apparatus 21 is configured to perform feature matching between reference information representing the object (referred to as a model pattern, a template, or the like) and an input image acquired by the vision sensor 10, and determine that the object has been successfully detected when the degree of matching exceeds a predetermined level (a threshold value). For example, in the feature matching, it is assumed that a range of the distance between a feature point of the model pattern and a corresponding point of an input image (hereinafter referred to as an "allowable corresponding point distance") is set as a detection parameter. In this case, if a small value is set as the detection parameter, the degree of matching may decrease and the object to be detected may not be found. On the other hand, if a large value is set as the detection parameter, feature points of the model pattern may erroneously correspond to feature points of the input image that are not valid as corresponding feature points, which may cause a false detection. The image processing apparatus 21 according to the present embodiment has a function of automatically setting a detection parameter suitable for obtaining detection results expected by the operator without trial and error by the operator.

The image processing apparatus 21 sets a detection parameter suitable for obtaining detection results expected by the operator through the following algorithm.

(Procedure A11) A list of detection results expected by the operator (a correct answer list) is generated for one or a plurality of input images, each including a captured image of an object to be detected.

(Procedure A12) A new detection parameter is set and detection is performed on the input images used in the above (procedure A11) (i.e., one or a plurality of input images prepared in advance before the value of the detection parameter is set) to acquire new detection results. Here, a processing time required for detection is recorded (detection list generation).

(Procedure A13) The newly acquired detection results are compared with the correct answer list to calculate a detection failure rate and a false detection rate when detection has been performed on the input images used in the above (procedure A11) with the newly set detection parameter.

(Procedure A14) The value of the objective function is calculated from the calculated detection failure rate and false detection rate and the recorded processing time required for detection. The objective function used here includes the detection failure rate, the false detection rate, and the processing time required for detection that the operator weights with freely-selected values.

(Procedure A15) The detection parameter search is terminated when the value of the objective function becomes less than a set value or when a specified number of detection parameters have been found. If such a condition is not met, a new detection parameter search is performed (the process returns to procedure A12).

(Procedure A16) Of the searched detection parameters, a detection parameter with which the value of the objective function is minimized is set in the image processing apparatus.

Various search methods known in the art such as Bayesian optimization, grid search, and random search can be used to search for a detection parameter that minimizes the objective function. Bayesian optimization can optimize a detection parameter with a smaller number of searches than grid search or random search because candidate parameters that are likely to obtain a good objective function value are probabilistically obtained from parameters that have already been examined and thus a parameter is efficiently searched for. Bayesian optimization is a black box optimization method, which is a method of searching for an input which minimizes an output for a function whose output value for an input is known but difficult to formulate (a black box function). Random search is a search method in which a value of the detection parameter is randomly set. In the present embodiment, Bayesian optimization is used to search for a detection parameter.

The objective function used here includes the detection failure rate, the false detection rate, and the processing time required for detection that are weighted. By changing the weighting values, the operator can determine which value of the detection failure rate, the false detection rate, and the processing time required for detection is to be preferentially minimized. For example, increasing the weight of the false detection rate preferentially searches for a detection parameter for fail-safe detection that eliminates false detections even if detection failures occur. On the other hand, increasing the weight of the detection failure rate can obtain a detection parameter particularly suitable for suppressing the occurrence of detection failures. Increasing the weight of the processing time can obtain a detection parameter particularly suitable for reducing the processing time.

The correct answer list generation section 223 generates a list of detection results expected by the operator (a correct answer list) for one or a plurality of input images, each including a captured image of the object to be detected, through the following algorithm.

(Procedure A21) Detection is performed on one or a plurality of input images, each including a captured image of an object to be detected, to acquire detection results. Each detection result includes information on the detected image, detected position, orientation, and size. Here, it is desirable that there be no or few detection failures even if there are many false detections and thus detection is performed by setting a detection parameter to a relatively loose value so that a relatively large number of detection results can be obtained.

(Procedure A22) An operation that the operator performs to label each detection result is received. Normally, the operator visually checks and labels each detection result with a correct/incorrect answer (whether the detection was correct or false).

(Procedure A23) Only detection results labeled with a correct answer are extracted from the detection results and a list of detection results expected by the operator for the input images (a correct answer list) is generated.

The detection rate calculation section 225 calculates a detection failure rate and a false detection rate when detection has been performed on the image data set with the newly set detection parameter through the following algorithm.

(Procedure A31) It is determined whether each detection result newly acquired for an input image matches a detection result included in the correct answer list. It is determined that the detection results match when the difference in detected position, orientation, and size is equal to or less than a set threshold value.

(Procedure A32) All determination results are totaled to calculate a detection failure rate and a false detection rate. If all detection results included in the correct answer list are included in the newly acquired detection result list, the detection failure rate is set to zero, and if none of the detection results not included in the correct answer list are included in the newly acquired detection result list, the false detection rate is set to zero. If the results expected by the operator are properly detected, both the detection failure rate and the false detection rate are zero.

As described above, a list of detection results labeled with a correct answer is generated for one or a plurality of input images, each including a captured image of an object to be detected, so that in response to a change of the detection parameter, a detection failure rate and a false detection rate when detection has been performed on the input images can be calculated without requiring the operator to check. Then, for example, a Bayesian optimization search which aims to make the false detection rate zero while minimizing the detection failure rate and the processing time required for detection is performed with the value of the detection parameter as an input, so that an optimal detection parameter with which only those intended by the operator are detected can be set without trial and error by the operator.

Figure 4:
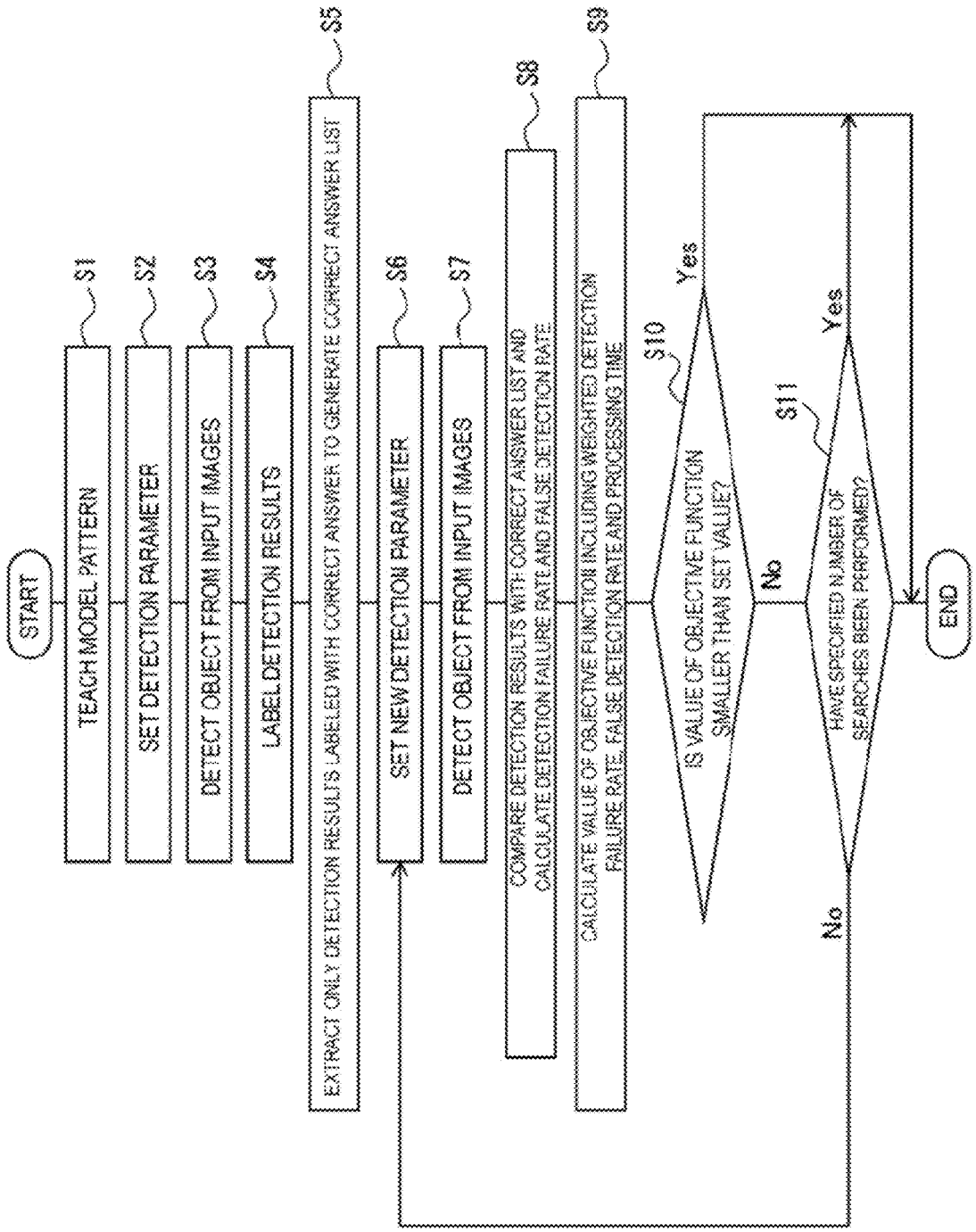
FIG. 4 is a flowchart of a detection parameter setting process.

FIG. 4 is a flowchart illustrating a process (hereinafter referred to as a detection parameter setting process) for specifically realizing the above-mentioned algorithm for setting a detection parameter suitable for obtaining detection results expected by the operator. The detection parameter setting process is performed under the control of the CPU of the image processing apparatus 21. The "allowable corresponding point distance" described above and a "threshold degree of matching" between features of the model pattern and features extracted from the input image are used as a detection parameter.

First, a model pattern is taught (step S1). That is, in step S1, the image processing section 22 generates a model pattern and stores the generated model pattern in the model pattern storage section 26.

The model pattern in the present embodiment includes a plurality of feature points. While various things can be used as feature points, edge points are used as feature points in the present embodiment. Edge points are points having a large luminance gradient in the image and can be used to acquire a contour shape of the object 1. Various methods known in the art can be used as a method for extracting edge points.

The physical quantities of an edge point include the position, the direction of the luminance gradient, the magnitude of the luminance gradient, and the like of the edge point. If the direction of the luminance gradient of the edge point is defined as the orientation of the feature point, it can define the position and orientation of the feature point in combination with the position. In the present embodiment, the physical quantities of an edge point, i.e., the position, the orientation (the direction of the luminance gradient), and the magnitude of the luminance gradient of the edge point, are stored as physical quantities of the feature point.

Figure 6:
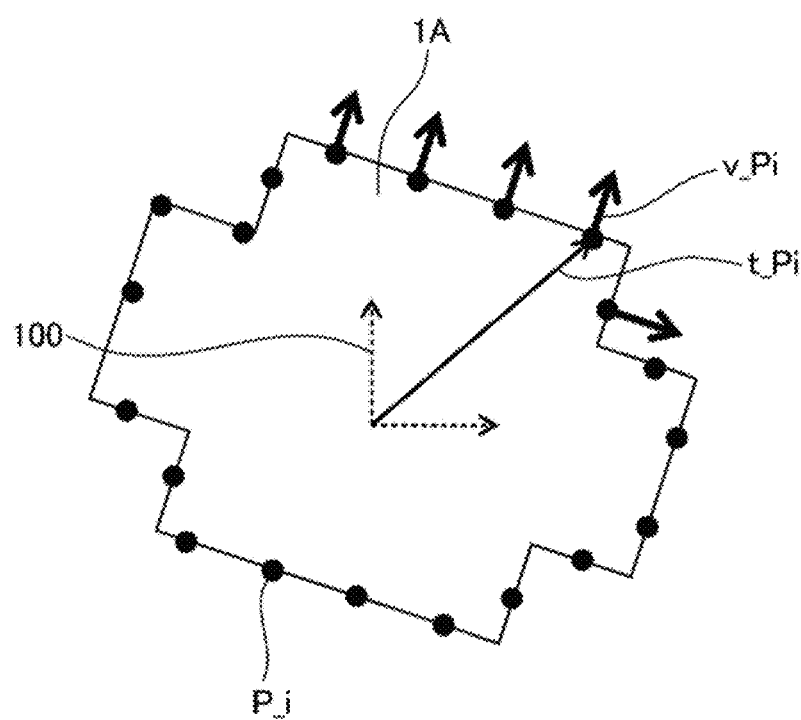
FIG. 6 is a diagram illustrating an example of a model pattern for an object.

FIG. 6 is a diagram illustrating an example of a model pattern for the object 1. As illustrated in FIG. 6, the model pattern for the object 1 includes a plurality of first feature points P_i (where i=1 to NP). The position and orientation of each first feature points P_i included in the model pattern may be expressed in any format, examples of which include an expression method in which a coordinate system 100 is defined for the model pattern (which is hereinafter referred to as a model pattern coordinate system 100) and the position t_Pi (where i=1 to NP) and the orientation v_Pi (where i=1 to NP) of each feature point included in the model pattern is expressed by a position vector, a direction vector, or the like seen from the model pattern coordinate system 100.

The origin of the model pattern coordinate system 100 may be defined in any way. For example, a point may be selected from the first feature points included in the model pattern and defined as the origin, or the center of gravity of all feature points included in the model pattern may be defined as the origin.

The orientation (the directions of the axes) of the model pattern coordinate system 100 may also be defined in any way. For example, the orientation of the model pattern coordinate system 100 may be defined so that the image coordinate system and the model pattern coordinate system 100 are parallel to each other in the image in which the model pattern is generated, or any two points may be selected from the feature points included in the model pattern and then the orientation of the model pattern coordinate system 100 may be defined so that the direction from one of the two selected points to the other is the direction of the X axis.

The first feature points Pi included in the model pattern are stored in the model pattern storage section 26, for example, in a format shown in Table 1 below (which includes the position, the orientation, and the magnitude of the luminance gradient).

TABLE 1

|  | POSITION | ORIENTATION | MAGNITUDE OF LUMINANCE GRADIENT |
|---|---|---|---|
| FEATURE POINT P_1 | (tx_P1, ty_P1) | (vx_P1, vy_P1) | α_P1 |
| FEATURE POINT P_2 | (tx_P2, ty_P2) | (vx_P2, vy_P2) | α_P2 |
| . . . | | | |
| FEATURE POINT P_NP | (tx_PNP, ty_PNP) | (vx_PNP, vy_PNP) | α_PNP |

Figure 5:
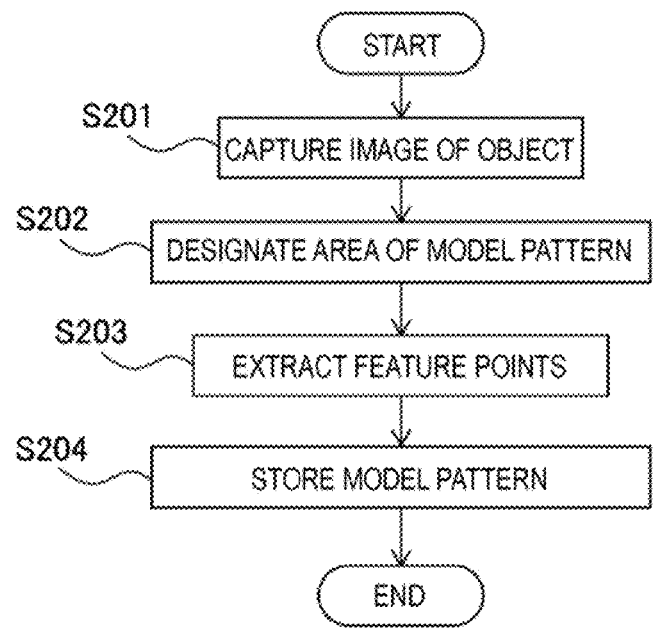
FIG. 5 is a flowchart illustrating a procedure for generating a model pattern.

FIG. 5 is a flowchart illustrating a procedure for generating a model pattern by the image processing section 22 in step S1 of FIG. 4. In step S201, an object 1 to be taught as a model pattern is arranged in the field of view of the vision sensor 10 and an image of the object 1 is captured. It is desirable that image capturing be performed such that the positional relationship between the vision sensor 10 and the object 1 at this time is the same as when the object 1 is detected.

Figure 7:
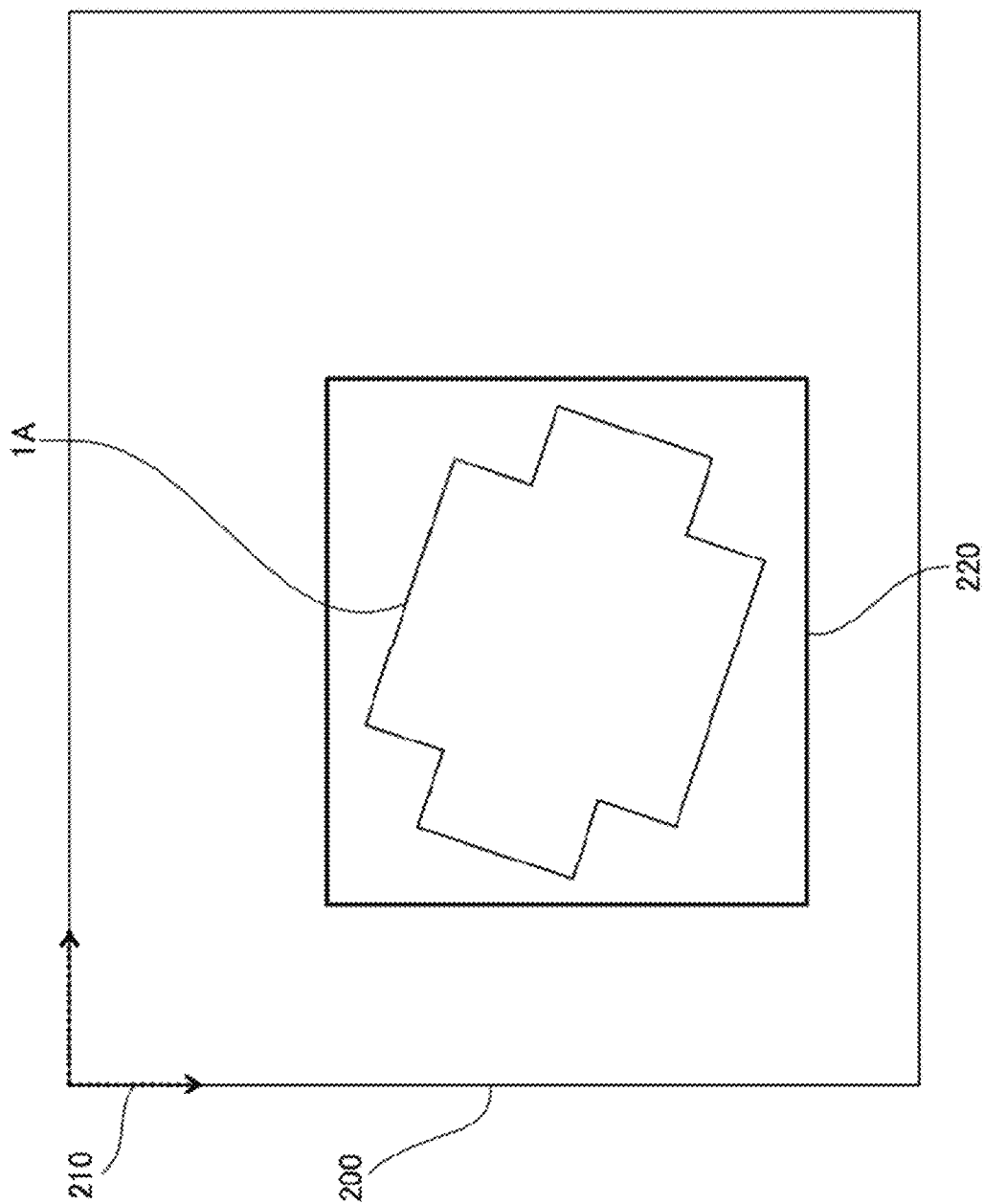
FIG. 7 is a diagram illustrating an example of a model pattern designation area in a captured image.

In step S202, an area in which the object 1 is imaged in the captured image is designated by a rectangle or a circle as a model pattern designation area. FIG. 7 is a diagram illustrating an example of a model pattern designation area in a captured image. As illustrated in FIG. 7, an image coordinate system 210 is defined in the captured image and a model pattern designation area (a rectangular area here) 220 is designated such that the model pattern designation area 220 includes an image 1A of the object 1 in the image coordinate system 210. The image processing section 22 may set the model pattern designation area 220 in response to receiving an instruction that the user has input through the operation panel 31 while viewing the image on the display device 32, or the image processing section 22 may obtain a portion having a large luminance gradient in the image as a contour of the image 1A and automatically designate the model pattern designation area 220 such that the image 1A is included in the model pattern designation area 220.

Next, in step S203, edge points are extracted within the range of the model pattern designation area 220 as feature points and physical quantities of each edge point such as the position, the orientation (the direction of the luminance gradient), and the magnitude of the luminance gradient of the edge point are obtained. The model pattern coordinate system 100 is defined in the designated area and the positions and orientations of the edge points are transformed from values expressed in the image coordinate system 210 into values expressed in the model pattern coordinate system 100.

Next, in step S204, the physical quantities of the extracted edge points are stored in the model pattern storage section 26 as first feature points P_i included in the model pattern. In the present embodiment, edge points are used as feature points, but feature points that can be used in the present embodiment are not limited to edge points, and for example, features such as those of scale-invariant feature transform (SIFT) known in the art may be used.

A model pattern may also be generated by arranging a geometric figure such as a line segment, a rectangle, or a circle such that it coincides with the contour line of the object captured in the image, instead of extracting edge points, SIFT feature points, or the like from the image of the object 1 and using them as first feature points included in the model pattern. In that case, feature points may be set at appropriate intervals on the geometric figure defining the contour line. Further, a model pattern can be generated based on CAD data or the like.

Returning to the process of FIG. 4, next, the image processing section 22 generates a list of detection results expected by the operator (a correct answer list) for one or a plurality of input images, each including a captured image of an object to be detected, in steps S2 to S5. The processing of steps S2 to S5 corresponds to the above-mentioned algorithm for generating a correct answer list (procedures A21 to A23). One or a plurality of input images, each including a captured image of an object to be detected, are prepared. For each of the input images, an appropriate threshold degree of matching and an appropriate allowable corresponding point distance are set and object detection is performed to acquire detection results. Here, the threshold degree of matching is set low and the allowable corresponding point distance is set large (step S2) because it is desirable that there be no or few detection failures even if there are many false detections. Then, detection of the image 1A of the object 1 (which may hereinafter be simply referred to as the object 1) is performed for each of the one or plurality of input images, each including a captured image of the object to be detected, to acquire detection results (step S3). Each detection result includes information on the detected image, detected position, orientation, and size.

The detection of the object 1 in step S3 will be described in detail. Detection of the object is performed through the following procedures.

Procedure 101: Object detection
Procedure 102: Selection of corresponding points
Procedure 103: Evaluation based on detection parameter Hereinafter, procedures 101 to 103 will be described. These procedures are performed under the control of the object detection section 221. In procedure 101 (object detection), the image 1A of the object 1 (which may hereinafter be simply referred to as the object 1) is detected for each of the input images I_j (where j=1 to NI). First, second feature points are extracted from the input image I_j. The second feature points are extracted by the same method as that for extracting the first feature points when generating the model pattern. In the present embodiment, edge points are extracted from the input image and used as second feature points. For the sake of explanation, let Q_jk (where k=1 to NQ_j) be NQ_j second feature points extracted from the input image I_j. The second feature points Q_jk are stored in the detection result storage section 27 in association with the input image I_j. At this time, the positions and orientations of the second feature points Q_jk are expressed in the image coordinate system 210.

Next, matching between the second feature points Q_jk extracted from the input image I_j and the first feature points P_i included in the model pattern is performed to detect the object 1. There are various methods for detecting the object, examples of which can include a generalized Hough transform, a random sample consensus (RANSAC), and an iterative closest point (ICP) algorithm known in the art.

It is assumed that NT_j images of the object have been detected from the input images I_j as results of the detection. Let T_jg (where g=1 to NT_j) be the detected images and R_Tjg be the detected position of each image T_jg. The detected position R_Tjg is a homogeneous transformation matrix representing the position and orientation of the image T_jg of the object seen from the image coordinate system 210, i.e., the position and orientation of the model pattern coordinate system 100 seen from the image coordinate system 210 when the model pattern is superimposed on the image T_jg, and is represented by the following equation.

$$R\_Tjg = \begin{bmatrix} a_{00} & a_{01} & a_{02} \\ a_{10} & a_{11} & a_{12} \\ 0 & 0 & 1 \end{bmatrix}$$ [Math. 1]

For example, when the object is not tilted with respect to the optical axis of the camera and only a congruence transformation needs to be considered as movement of the image of the object in the image, $a_{00}$ to $a_{12}$ are as follows.

$a_{00} = \cos \theta$
$a_{01} = -\sin \theta$
$a_{02} = x$
$a_{10} = \sin \theta$
$a_{11} = \cos \theta$
$a_{12} = y$ Here, (x, y) is the position in the image and $\theta$ is the amount of rotational movement in the image.

When the object is not tilted with respect to the optical axis of the camera but the distance between the object and the camera is not constant, the size of the image of the object imaged in the image changes according to the distance and thus the movement of the image of the object imaged in the image is a similarity transformation. In this case, $a_{00}$ to $a_{12}$ are as follows.

$a_{00} = s \cdot \cos \theta$
$a_{01} = -s \cdot \sin \theta$
$a_{02} = x$
$a_{10} = s \cdot \sin \theta$
$a_{11} = s \cdot \cos \theta$
$a_2 = y$ Here, s is the ratio between the size of the taught model pattern and the size of the image T_jg of the object.

It is assumed that the same processing has been performed for each of the input images I_j (where j=1 to NI) and a total of NT images have been detected. The total number NT is expressed by the following equation.

$$NT = \sum_{j=0}^{NI} NT\_j$$ [Math. 2]

The detected positions R_Tjg are stored in the detection result storage section 27 in association with the input images I_j.

Next, procedure 102 (selection of corresponding points) will be described. The processing function of procedure 102 is provided by the corresponding point selection section 222. In procedure 102, based on the detected position R_Tjg of the image T_jg (where j=1 to NI and g=1 to NT_j) of the object detected from each input image I_j (where j=1 to NI), second feature points corresponding to the first feature points Pi included in the model pattern among the second feature points Q_jk (where j=1 to NI and k=1 to NQ_j) extracted from the input image I_j are selected as corresponding points.

For the sake of explanation, the positions and orientations of the first feature points P_i included in the model pattern will be represented by homogeneous transformation matrices R_Pi. R_Pi can be written as follows.

$$R\_Pi = \begin{bmatrix} b_{00} & b_{01} & b_{02} \\ b_{10} & b_{11} & b_{12} \\ 0 & 0 & 1 \end{bmatrix} \quad [\text{Math. 3}]$$

$b_{00}=vx\_Pi$
$b_{01}=-vy\_Pi$
$b_{02}=tx\_Pi$
$b_{10}=vy\_Pi$
$b_{11}=vx\_Pi$
$b_{12}=ty\_Pi$

Here, t_Pi=(tx_Pi, ty_Pi) is the position of P_i in the model pattern coordinate system and v_Pi=(vx_Pi, vy_Pi) is the orientation of Pi in the model pattern coordinate system.

The orientation of P_i can also be expressed by an angle r_Pi instead of a vector. By using r_Pi, v_Pi can be expressed as v_Pi=(vx_Pi, vy_Pi)=(cos r_Pi, sin r_Pi). Similarly, the positions and orientations of the second feature points_Q_jk extracted from the input image I_j are also represented by homogeneous transformation matrices R_Qjk.

Here, it should be noted that the positions and orientations R_Pi of the first feature points P_i included in the model pattern are expressed in the model pattern coordinate system and the positions and orientations R_Qjk of the second feature points Q_jk extracted from the input image I_j are expressed in the image coordinate system. Thus, the relationship between the two will be clarified.

Letting R_Pi' be the position and orientation of a first feature point Pi seen from the image coordinate system when the model pattern is superimposed on the image T_jg of the object imaged in the image I_j, R_Pi' can be expressed as follows by using the position and orientation R_Pi of the first feature point P_i seen from the model pattern coordinate system and the detected position R_Tjg of the image T_jg seen from the image coordinate system.

$$R\_Pi'=R\_Tjg \cdot R\_Pi \quad (1)$$

Similarly, letting R_Qjk' be the position and orientation of a second feature point Q_jk seen from the model pattern coordinate system when the model pattern is superimposed on the image T_jg of the object, R_Qjk' can be expressed as follows by using the position and orientation R_Qjk of Q_jk seen from the image coordinate system and the detected position R_Tjg of the image T_jg seen from the image coordinate system.

$$R\_Qjk'=R\_Tjg^{-1} \cdot R\_Qjk \quad (2)$$

For the explanation below, let t_Pi' be the position of P_i seen from the image coordinate system, v_Pi' be the orientation of P_i seen from the image coordinate system, t_Qjk be the position of Q_jk seen from the image coordinate system, v_Qjk be the orientation of Q_jk seen from the image coordinate system, t_Qjk' be the position of Q_jk seen from the model pattern coordinate system, and v_Qjk' be the orientation of Q_jk seen from the model pattern coordinate system.

Based on the above, association between the first feature points Pi included in the model pattern and the second feature points Q_jk (where j=1 to NI and k=1 to NQ_j) extracted from the input image I_j is performed through the following procedures.

B1. Based on the detected position R_Tjg of the image T_jg of the object detected from the input image I_j, the positions and orientations R_Pi of the first feature points Pi included in the model pattern are transformed into positions and orientations R_Pi' seen from the image coordinate system through equation (1).

B2. For each of the first feature points P_i, a second feature point closest thereto is searched for among the second feature points Q_jk. The following methods can be used for the search.

(A) The distances between the position and orientation R_Pi' of the first feature point and the positions and orientations R_Qjk of all second feature points are calculated and a second feature point Q_jk with the smallest distance is selected.

(B) In a two-dimensional array having the same number of elements as the number of pixels of the input image I_j, the positions and orientations R_Qjk of the second feature points are stored at elements of the two-dimensional array corresponding to pixels at the positions and an area in the two-dimensional array near a pixel corresponding to the position and orientation R_Pi of the first feature point is searched two-dimensionally and a second feature point Q_jk found first is selected.

B3. It is evaluated whether the selected second feature point Q_jk is appropriate as a corresponding point of the first feature point P_i. For example, the distance between the position and orientation R_Pi' of the first feature point P_i and the position and orientation R_Qjk of the second feature point Q_jk is calculated, and if the distance is equal to or less than a threshold value, it is determined that the selected second feature point Q_jk is appropriate as a corresponding point of the first feature point P_i.

Further, evaluation may be performed additionally based on the differences in physical quantities such as the orientation and the magnitude of the luminance gradient between the first feature point P_i and the second feature point Q_jk, and if they are also equal to or less than a threshold value or equal to or greater than a threshold value, it may be determined that the selected second feature point Q_jk is appropriate as a corresponding point of the first feature point P_i.

B4. If it is determined that the selected second feature point Q_jk is appropriate as a corresponding point of the first feature point P_i, the selected second feature point Q_jk is stored in the detection result storage section 27 in association with P_i as a corresponding point O_im of the first feature point P_i. Letting R_Oim be the position and orientation of the corresponding point O_im seen from the image coordinate system, R_Oim=R_Qjk, which is the position and orientation seen from the image coordinate system, and thus it is stored after being transformed into the position and orientation R_Oim' seen from the model pattern coordinate system. R_Oim' can be calculated by equation (2) as follows.

$$R'_{Oim} = R_{Tjg}^{-1} R_{Oim} \qquad \text{[Math. 4]}$$

It is assumed that NO_i corresponding points, which have been determined to correspond to an i-th feature point Pi of the model pattern, have been found by performing the above processing for each of the NT detected positions R_Tjg (where j=1 to NI and g=1 to NQ_j) detected from the input images I_j (where j=1 to NI). Let O_im (where m=1 to NO_i) be an m-th corresponding point corresponding to the i-th feature point P_i of the model pattern. NO_i<=NT because the total number of images of the object detected from the input images I_j is NT. The obtained corresponding points are stored in the model pattern storage section 26 in a format shown in Table 2 below.

TABLE 2

|  | MODEL PATTERN | DETECTED PATTERN 1 | . . . | DETECTED PATTERN NT |
|---|---|---|---|---|
| FEATURE POINT P_1 | (tx_P1, ty_P1), (vx_P1, vy_P1) | (tx_O1m1, ty_O1m1), (vx_O1m1, vy_O1m1) |  | (tx_O1mNT, ty_O1mNT), (vx_O1mNT, vy_O1mNT) |
| FEATURE POINT P_2 | (tx_P2, ty_P2), (vx_P2, vy_P2) | (tx_O2m1, ty_O2m1), (vx_O2m1, vy_O2m1) |  | (tx_O2mNT, ty_O2mNT), (vx_O2mNT, vy_O2mNT) |
| . . . |  |  |  |  |
| FEATURE POINT P_NP | (tx_PNP, ty_PNP), (vx_PNP, vy_PNP) | (tx_ONPm1, ty_ONPm1), (vx_ONPm1, vy_ONPm1) |  | (tx_ONPmNT, ty_ONPmNT), (vx_ONPmNT, vy_ONPmNT) |

Next, procedure 103 (evaluation based on a detection parameter) will be described. Here, it is checked whether each second feature point selected through the above procedure 102 (selection of corresponding points) is appropriate as a corresponding point of the first feature point P_i. Here, the "allowable corresponding point distance" is used as a detection parameter. If the distance between the first feature point Pi and the corresponding second feature point Q_jk when the model pattern is superimposed on the image T_jg is equal to or less than the "allowable corresponding point distance", it is determined that the corresponding point (the second feature point) is appropriate. The appropriate corresponding point is stored in the detection result storage section 27 as a corresponding point O_i of P_i.

It is assumed that NO corresponding points can be selected by performing the above procedures 102 and 103 for all first feature points P_i (where i=1 to NP). NO/NP is obtained by using the total number NP of first feature points included in the model pattern and the number NO of corresponding points found, so that the degree of matching between the model pattern and the image T_x can be expressed as a value between 0.0 to 1.0. Images T_x with a degree of matching less than a "threshold degree of matching" are excluded from the detection results.

Figure 8:
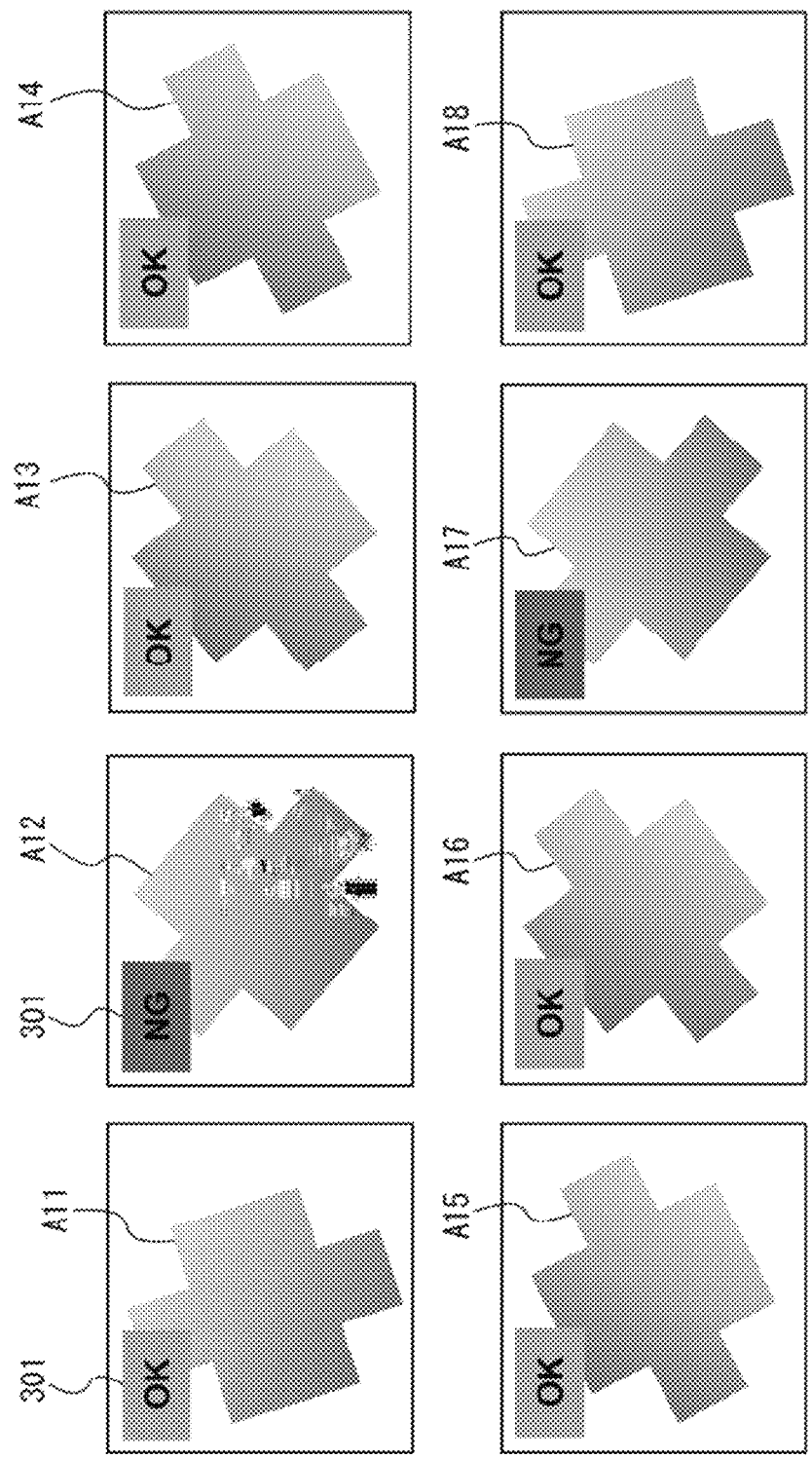
FIG. 8 is a diagram illustrating a state in which detected images are labeled to generate a correct answer list.

Returning to the process of FIG. 4, next in step S4, the detection results are labeled. Normally, the operator visually checks and labels each detection result with a correct/incorrect answer (whether the detection was correct or false). FIG. 8 shows, as an example, a state in which eight images A11 to A18 of an object are detected from input images through the detection process (procedures 101 to 103) in step S3 and displayed on the display device 32. The operator labels each of the detected images with a correct answer (OK) or an incorrect answer (NG). For labeling, OK and NG may be switched by clicking the portion of a label image 301 in the image. In the example of FIG. 8, the operator labels the images A11, A13 to A16, and A18 with a correct answer and the images A12 and A17 with an incorrect answer.

Next, in step S5, only detection results labeled with a correct answer are extracted from the detection results and the extracted detection results are used as detection results expected by the operator (a correct answer list) for the input images. In the case of the example of FIG. 8, the correct answer list includes the images A11, A13 to A16, and A18.

Next, in the loop processing of steps S6 to S11, a detection parameter search is performed by Bayesian optimization. First, a new detection parameter (a threshold degree of matching and an allowable corresponding point distance) is set (step S6) and the above-mentioned detection process (procedures 101 to 103) is performed on the input images that have been used to generate the correct answer list to acquire detection results (step S7). Each detection result includes information on the detected image, detected position, orientation, and size. Here, a processing time required for detection is also recorded.

Next, in step S8, the detection rate calculation section 225 compares the detection results obtained in step S7 with the correct answer list to calculate a detection failure rate and a false detection rate when detection has been performed on the input images with the detection parameter (the threshold degree of matching and the allowable corresponding point distance) newly set in step S6. Here, the detection rate calculation section 225 determines that detection results match when images that have been subjected to detection are the same (ID numbers attached to the images are the same) and the difference in detected position, orientation, and size is equal to or less than a preset threshold value.

The detection rate calculation section 225 calculates the detection failure rate such that the detection failure rate is zero when all detected results included in the correct answer list are included in the newly acquired detection results. The detection rate calculation section 225 calculates the false detection rate such that the false detection rate is zero when none of the detection results not included in the correct answer list are included in the newly acquired detection result list. Specifically, when the number of images included in the correct answer list is N and the number of images included in the correct answer list among the images detected with the new detection parameter is $m_0$, the detection rate calculation section 225 may calculate the detection failure rate by the following equation.

(Detection failure rate)=$(N-m_0)/N$

When the number of images included in the correct answer list is N and the number of images detected with the new detection parameter that are not included in the correct answer list is $m_1$, the detection rate calculation section 225 may calculate the false detection rate by the following equation.

(False detection rate)=$m_1/N$

Next, in step S9, the objective function value calculation section 226 calculates a value of the objective function in which the detection failure rate and the false detection rate calculated in step S8 and the processing time required for detection in step S7 are weighted by the weighted values that have been input through a weight value input operation. In this case, the objective function value calculation section 226 receives weight values that the operator has input through an operation via the operation panel 31. Here, when $x_1$, $x_2$, and $x_3$ are the detection failure rate, the false detection rate, and the processing time, respectively, and w1, w2, and w3 are the weight values for $x_1$, $x_2$, and $x_3$, respectively, the objective function f is expressed by the following equation.

$$f = \sum_{i=1}^{3} w_i \cdot x_i \qquad \text{[Math. 5]}$$

The objective function is calculated as described above and the search is terminated when the value of the objective function is smaller than a preset value (S10: YES) or when a specified number of searches have been performed (S11: YES). When the objective function is equal to or greater than the set value and the specified number of searches have not yet been completed (S10: NO and S11: NO), a series of processing from steps S6 to S11 of setting a new detection parameter and performing detection is repeated.

In the parameter search process, the objective function is calculated as described above and the detection parameter search is terminated when the value of the objective function is minimized or sufficiently lowered as described above. According to the parameter setting process, it is possible to automatically set an optimal detection parameter for obtaining detection results expected by the operator without trial and error by the operator as described above.

The image processing apparatus 21 sets the detection parameter obtained through the above processing as a detection parameter used to detect the object.

As described above, the present embodiment enables automated setting of a detection parameter suitable for obtaining desired detection results.

While the present invention has been described above by using typical embodiments, it is to be understood that those skilled in the art can make changes, various other modifications, omissions, and additions to each of the above embodiments without departing from the scope of the present invention.

Although the "allowable corresponding point distance" and the "threshold degree of matching" are used as detection parameters in the embodiment described above, these are examples and other detection parameters may be used in place of or in addition to these. For example, an allowable range may be set in the direction of the luminance gradient of the edge point or an allowable range may be set in the magnitude of the luminance gradient of the edge point as a detection parameter.

In the loop processing of steps S6 to S11 in the detection parameter setting process illustrated in FIG. 4 (i.e., the detection parameter search process with Bayesian optimization), the operator may give calculation values for the value of the objective function and some detection parameters in advance to reduce the time for search processing (the number of searches).

Although a function having three input variables, the detection failure rate, the false detection rate, and the processing time, is used as the objective function f in the embodiment described above, an objective function having at least one of these input variables as an input variable may also be used. For example, when an objective variable having the detection failure rate as an input variable is used, it is possible to search for a detection parameter suitable for reducing the detection failure rate. The detection rate calculation section 225 may also be configured to calculate either the detection failure rate or the false detection rate.

A program that performs various processes such as the detection parameter setting process in the embodiment described above can be recorded on various computer-readable recording media (e.g., a semiconductor memory such as a ROM, an EEPROM, or a flash memory, a magnetic recording medium, or an optical disc such as a CD-ROM or a DVD-ROM).

REFERENCE SIGNS LIST

1 Object
10 Vision sensor
11 Robot
12 Hand
20 Vision sensor controller
21 Image processing apparatus
22 Image processing section
31 Operation panel
32 Display device
221 Object detection section
222 Corresponding point selection section
223 Correct answer list generation section
224 Detection result list generation section
225 Detection rate calculation section
226 Objective function value calculation section
227 Detection parameter search section

The invention claimed is:

1. An image processing apparatus for detecting an image of an object in one or more pieces of input image data based on a model pattern for the object, the image processing apparatus comprising:

an object detection section configured to perform matching between a feature of the model pattern and a feature extracted from the one or more pieces of input image data by using a detection parameter and detect an image of the object from the one or more pieces of input image data;

a detection rate calculation section configured to compare a detection result that the object detection section has obtained for the one or more pieces of input image data prepared in advance before a value of the detection parameter is set and information representing a desired detection result when detection of an image of the object has been performed on the one or more pieces of input image data to calculate at least one of a detection failure rate and a false detection rate in the detection of the object by the object detection section;

an objective function value calculation section configured to calculate a value of an objective function defined as a function having at least one of the detection failure rate and the false detection rate as an input variable; and a detection parameter search section configured to change the value of the detection parameter and repeat the detection of the object by the object detection section, calculation of at least one of the detection failure rate and the false detection rate by the detection rate calculation section, and calculation of the value of the objective function by the objective function value calculation section to perform search for the detection parameter until the value of the objective function satisfies a predetermined condition or the number of searches for the detection parameter reaches a specified number.

2. The image processing apparatus of claim 1, wherein the objective function is defined as a sum of values obtained by multiplying the detection failure rate, the false detection rate, and a processing time required for the object detection section to detect an image of the object by respective weight values.

3. The image processing apparatus of claim 1- or 2, wherein the object detection section is configured to perform matching between a first feature point of the model pattern and a second feature point extracted from the one or more pieces of input image data, and the detection parameter includes an allowable distance between the first feature point and the second feature point in the one or more pieces of input image data corresponding to the first feature point.

4. The image processing apparatus of claim 3, wherein the detection parameter further includes a threshold value for a degree of matching that is defined as a ratio of the number of second feature points within the allowable distance among the second feature points corresponding to the first feature points to a total number of the first feature points of the model pattern.

5. The image processing apparatus of claim 1, wherein the predetermined condition is that the value of the objective function be lower than a preset value.

6. The image processing apparatus of claim 1, wherein the detection parameter search section uses either Bayesian optimization or random search for the search of the detection parameter.

* * * * *

UNITED STATES PATENT AND TRADEMARK OFFICE
CERTIFICATE OF CORRECTION

PATENT NO. : 12,205,347 B2
APPLICATION NO. : 17/794070
DATED : January 21, 2025
INVENTOR(S) : Shoutarou Ogura Page 1 of 1

It is certified that error appears in the above-identified patent and that said Letters Patent is hereby corrected as shown below:

In the Claims

In Column 17, Line 16 in Claim 3 the phrase "1- or 2," should read -- 1, --.

Signed and Sealed this
Eleventh Day of March, 2025

Coke Morgan Stewart
*Acting Director of the United States Patent and Trademark Office*